United States Patent
Horng et al.

(10) Patent No.: US 6,396,671 B1
(45) Date of Patent: May 28, 2002

(54) RUTHENIUM BIAS COMPENSATION LAYER FOR SPIN VALVE HEAD AND PROCESS OF MANUFACTURING

(75) Inventors: Cheng T. Horng; Mao-Min Chen, both of San Jose; Kochan Ju, Fremont; Min Li, Fremont; Simon H. Liao, Fremont; Ku-Ying Tong, San Jose, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/525,670

(22) Filed: Mar. 15, 2000

(51) Int. Cl.$^7$ .................................................. G11B 5/39
(52) U.S. Cl. ............................. 360/324.1; 29/603.14; 360/324.12
(58) Field of Search ..................... 360/324.12, 324.1; 29/603.07, 603.18

(56) References Cited

U.S. PATENT DOCUMENTS

| | | | |
|---|---|---|---|
| 5,701,222 A | 12/1997 | Gill et al. ................... | 360/113 |
| 5,701,223 A | 12/1997 | Fontana, Jr. et al. ........ | 360/113 |
| 5,920,446 A | 7/1999 | Gill ............................. | 360/113 |
| 5,998,016 A | 12/1999 | Sasaki et al. ............... | 428/336 |
| 6,208,492 B1 * | 3/2001 | Pinarbasi ............... | 360/324.11 |
| 6,268,985 B1 * | 7/2001 | Pinarbasi ............... | 360/324.11 |

* cited by examiner

*Primary Examiner*—A. J. Heinz
(74) *Attorney, Agent, or Firm*—George O. Saile; Stephen B. Ackerman

(57) ABSTRACT

A spin valve structure, and method for manufacturing it, are described. The valve is subject to only small bias point shifts by sense current fields while at the same time has good GMR characteristics. This is achieved by introducing a layer of about 15 Angstroms of ruthenium between the seed layer and the free layer. This acts as an effective bias control layer with the added benefit of providing interfaces (to both the seed and the free layer) that are highly favorable to specular reflection of the conduction electrons. The HCP crystal structure of this ruthenium layer also improves the crystalline quality of the free layer thereby improving its performance with respect to the GMR ratio.

17 Claims, 2 Drawing Sheets

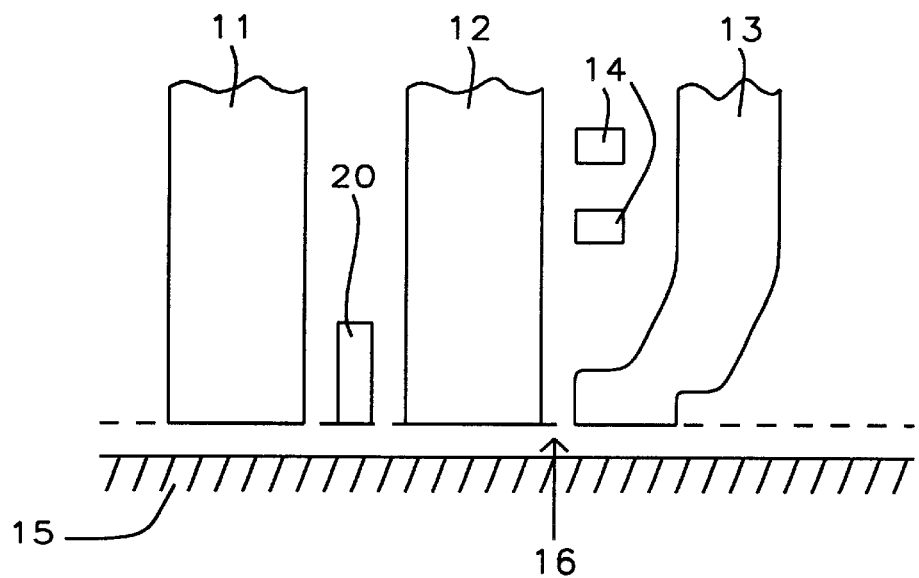
*FIG. 1 — Prior Art*
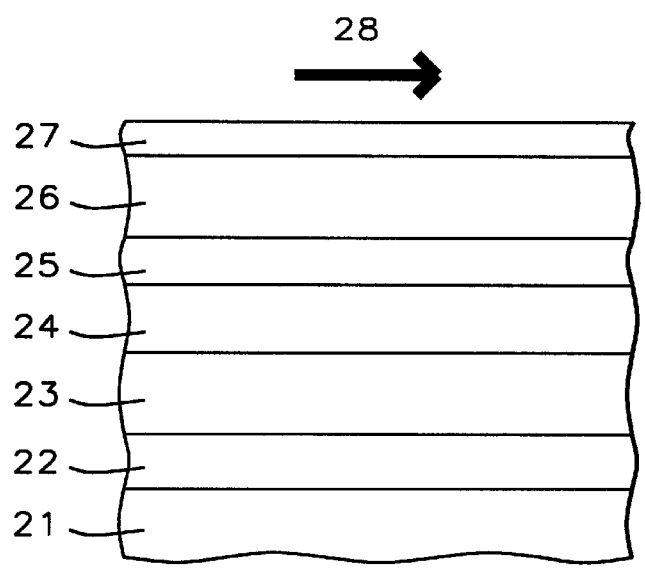
*FIG. 2 — Prior Art*

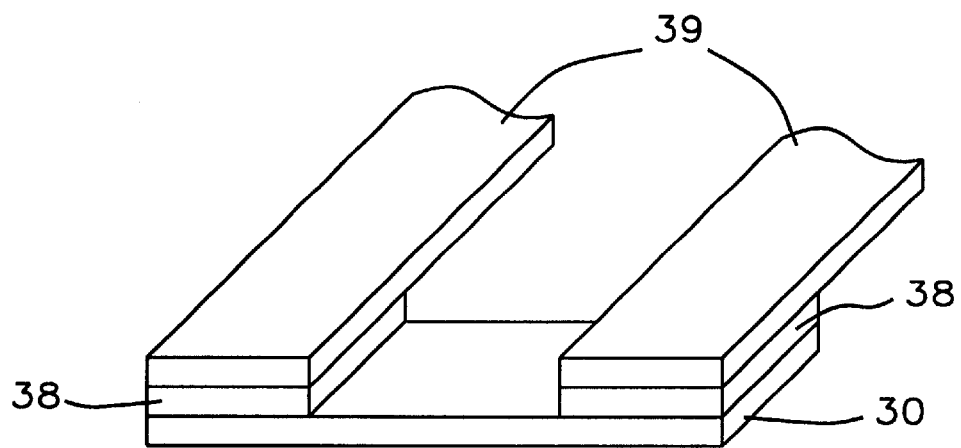
FIG. 3 - Prior Art
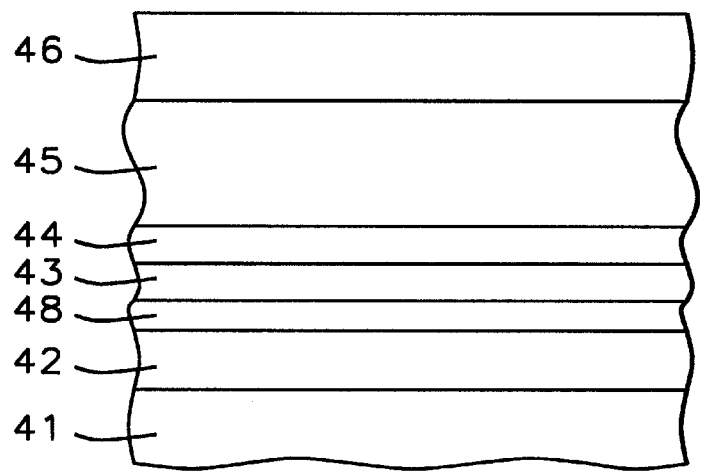
FIG. 4

RUTHENIUM BIAS COMPENSATION LAYER FOR SPIN VALVE HEAD AND PROCESS OF MANUFACTURING

FIELD OF THE INVENTION

The invention relates to the general field of magnetic disk systems with particular reference to GMR based read heads and its bias control layer.

BACKGROUND OF THE INVENTION

An example of a read-write head for a magnetic disk system is schematically illustrated in FIG. 1. The magnetic field that 'writes' a bit at the surface of recording medium 15 is generated by a flat coil, two of whose windings 14 can be seen in the figure. The magnetic flux generated by the flat coil is concentrated within pole pieces 12 and 13 which, while being connected at a point beyond the top edge of the figure, are separated by small gap 16. Thus, most of the magnetic flux generated by the flat coil passes across this gap with fringing fields extending out for a short distance where the field is still powerful enough to magnetize a small portion of recoding medium 15.

The present invention is directed towards the design of read element 20 which can be seen to be a thin slice of material located between magnetic shields 11 and 12 (12 doing double duty as a pole piece, as just discussed). The principle governing the operation of read sensor 20 is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

The magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 2. In addition to a seed layer 22 on a substrate 21 and a topmost cap layer 27, these key elements are two magnetic layers 23 and 25, separated by a non-magnetic layer 24. The thickness of layer 24 is chosen so that layers 23 and 25 are sufficiently far apart for exchange effects to be negligible (the layers do not influence each others magnetic behavior at the atomic level) but are close enough to be within the mean free path of conduction electrons in the material. If, now, layers 23 and 25 are magnetized in opposite directions and a current is passed though them along the direction of magnetization (such as direction 28 in the figure), half the electrons in each layer will be subject to increased scattering while half will be unaffected (to a first approximation). Furthermore, only the unaffected electrons will have mean free paths long enough for them to have a high probability of crossing over from 23 to 25 (or vice versa). However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one the layers 23 and 25 is permanently fixed, or pinned. In FIG. 2 it is layer 25 that is pinned. Pinning is achieved by first magnetizing the layer (by depositing and/or annealing it in the presence of a magnetic field) and then permanently maintaining the magnetization by over coating with a layer of antiferromagnetic material, or AFM, (layer 26 in the figure). Layer 23, by contrast, is a "free layer" whose direction of magnetization can be readily changed by an external field (such as that associated with a bit at the surface 15 of a magnetic disk).

The present invention is particularly directed to minimizing certain noise effects associated with multiple sensings of a magnetized layer. As first shown by Barkhausen in 1919, magnetization in iron can be irregular because of reversible breaking of magnetic domain walls, leading to the phenomenon of Barkhausen noise (BN). Long MR stripes are known to reduce this significantly for wide track recording but, for narrow-track (disk) recording, the problems of electrical signal spikes and instabilities can become serious concerns. Here, instability refers to the repeatability of output waveforms during repeated write/read cycles. The solution to this problem is to provide operating conditions conducive to single-domain films for MR sensor and to ensure that the domain configuration remains unperturbed after processing and fabrication steps.

One of two methods is usually used to reduce or eliminate BN. The first is to increase the effective magnetic length of the MR stripe. Long stripes exhibit reduced demagnetization at their ends and hence tend to retain single magnetic domain in the stripe. In the second method the presence of a small magnetic field in the easy axis direction of the stripe maintains a single domain and thus reduces RN. This is accomplished by depositing a longitudinal exchange bias layer directly in contact with the spin valve structure. However, a field of this sort tends to reduce the sensitivity of the sensor to a transverse field, resulting in a lower signal output. One solution to this problem that is commonly used in the prior art is to apply the longitudinal bias only in the two edge regions, as shown in FIG. 3. The longitudinally biased edge regions 38 apply a small field to sensor 30, eliminating BN while at the same time retaining the signal sensitivity of the central region. To provide this selective bias at the edges, a layer of exchange material like MnFe is deposited on the top edges of the MR-stripe. The selective longitudinal field ensures a single domain in the edge region thereby maintaining a single domain in the central section Also seen in the figure are contact leads 39.

A routine search of the prior art was conducted. While several references to various laminated structures within spin valves were encountered, none of these disclosed the exact structure or process of the present invention. Several of the references found were, however, of interest. For example, U.S. Pat. No. 5,920,446(Gill) discloses a GMR structure made up of two free layers separated by copper. These free layers are themselves laminates of two ferromagnetic layers separated by a layer of ruthenium. The latter serves as an APC (anti-parallel coupling) layer. This arrangement allows the structure to function without a pinned layer, thereby reducing its thickness.

In U.S. Pat. No. 5,998,016, Sasaki et al. incorporate an anti-diffusion layer in their spin valve structure. The preferred material for this is tantalum but ruthenium is listed as one of the alternatives. Gill et al. (U.S. Pat. No. 5,701,222)

and Fontana, Jr, et al. (U.S. Pat. No. 5,701,223) both describe variations on the basic spin valve structure.

SUMMARY OF THE INVENTION

It has been an object of the present invention is to provide a synthetic antiferromagnet spin valve with controllable bias point and high output performance.

Another object of the invention has been that it should be compatible with a range of free layer compositions and thicknesses.

A further object has been that the total thickness of said spin valve be less than about 400Å.

These objects have been achieved by introducing a layer of about 15 Angstroms of ruthenium between the seed layer and the free layer. This acts as an effective bias control layer with the added benefit of providing interfaces (to both the seed and the free layer) that are highly favorable to specular reflection of the conduction electrons. The HCP crystal structure of this ruthenium layer also improves the crystalline quality of the free layer thereby improving its performance with respect to the GMR ratio.

BRIEF DESCRIPTION OF THE DRAWINGS

FIG. 1 illustrates the basic parts of a read-write head for a magnetic disk system.

FIG. 2 shows the layers that make up a typical spin valve structure.

FIG. 3 shows a bias control layer of the prior art.

FIG. 4 shows the layers that make up the spin valve structure of the present invention.

DESCRIPTION OF THE PREFERRED EMBODIMENTS

An ultra-thin free layer, combined with a high GMR ratio, is an effective means to form a high output spin valve head capable of over 30 Gb/in$^2$ magnetic recording. However, as the free layer thickness decreases, it becomes difficult to control the bias point provided by the bias compensation layer (BCL), while also achieving a high GMR ratio and good softness. It is, however, known that an increase in magneto-conductance can be achieved (beyond that of NiFe or Co alone) by replacing most of the NiFe (or Co) in the free layer with a non-magnetic metal such as Cu. A structure of this type is referred to as a spin-filter spin valve (SFSV).

For a SFSV, the free layer is placed between the Cu spacer and an additional high-conductance-layer (HCL). The SFSV reduces sense current fields in the free layer by shifting the sense current center toward the free layer, resulting in a small bias point shift by the sense current fields. A high GMR ratio is maintained even in the ultra-thin free layer because the HCL improves the mean free path of spin-up electrons while maintaining the mean free path difference between spin-up and spin-down electrons.

In a recent application (HT99-028 application Ser. No. 09/483,937 dated Jan. 18, 2000), Horng et al. disclosed a low resistance NiCr/Ru/NiCr conductor lead structure, in which specular reflection of the conduction electrons at the NiCr/Ru interface is responsible for the improved conductivity. Since ruthenium has a HCP (hexagonal close packed) crystal structure, which is the same as CoFe, it was reasoned that NiCr/Ru could also serve as an effective BCL for use in specular CoFe based spin valves.

We will disclose the present invention by describing the process used to manufacture it. In the course of doing so, the structure of the present invention will also become evident. Referring now FIG. 4, the process begins with the provision of suitable dielectric underlayer 41 such as aluminum oxide or silicon oxide on whose surface is deposited a seed layer 42. The preferred material for the seed layer is nickel-chromium having a thickness of about 55Å.

Normal (prior art) practice would now be to form, on the seed layer, a NiFe/CoFe free layer. In a significant departure from prior art practice, the material used for BCL 48 is ruthenium. This layer should have a hexagonal close-packed crystal structure. Our preferred deposition method has been DC-magnetron sputtering at a deposition power of about 20 watts, a gas pressure of about 2 millitorr, and a target/substrate spacing of about 2 inches, resulting in a deposition rate of about 0.3 Angstroms/second. Other, similar deposition methods could also have been used. Ruthenium layer 48 is not patterned but covers the entire seed. The preferred thickness for the ruthenium layer is about 15 Å. The ruthenium-seed layer interface will be discussed further below and is itself a key feature of the invention.

Next, free layer 43 is deposited on ruthenium layer 48. The invention is such that it will operate effectively for a wide range of free layer compositions and thicknesses. In a first embodiment, the free layer is cobalt-iron about 20 Å thick. In a second embodiment, the free layer is cobalt about 20 Å thick, while in a third embodiment, the free layer is a laminate of 3 Å of cobalt-iron on about 32 Å of nickel-iron. The ruthenium-free layer interface will also be discussed further below since it is also a key feature of the invention.

Then, non-magnetic copper spacer layer 44 is deposited on free layer 43. The preferred thickness for the copper layer is about 20 Å. This is followed by the deposition of synthetic antiferromagnetic layer 45 on copper spacer layer 44. Although shown in the figure as a single layer, the synthetic antiferromagnetic layer is usually a laminate of several layers. Our preferred laminate composition has been (starting immediately above the copper spacer layer): a cobalt-iron layer about 19 Å thick; a ruthenium layer about 6–9 Å thick, with 7.5 Å being preferred; and a second cobalt-iron layer about 21 Å thick. On the latter is a manganese-platinum layer between about 100 and 200 Å thick with about 120 Å being preferred. The structure is completed by depositing cap layer 46 (about 50 Å of nickel-chrome) on synthetic antiferromagnetic layer 45.

The final step in the process of the present invention is a two stage annealing treatment of the completed spin valve head. In the first stage the structure is heated in a magnetic field of between about 5,000 and 10,000 Oersted at a temperature between about 250° and 280° C. for between about 120 and 300 minutes. This allows synthetic antiferromagnetic layer 45 to acquire a permanent pinned layer direction. For the second annealing stage, heating is performed in a magnetic field of between about 50 and 100 Oersted at a temperature between about 280 and 290° C. for between about 60 and 120 minutes. This resets the sensor layer direction of layer 43.

Confirmation of the effectiveness of the general approach taken by the present invention, as well as of the improved performance of devices made according to the teachings of the present invention, was obtained from the following experimental data:

Using the CVC GMR sputtering system, spin valves having the following structure were formed: 55 Å NiCr seed layer/BCU 20 Å CoFe/(20–21)Å Cu/19 Å CoFe/7.5 Å Ru/21Å CoFe/120 Å MnPt/50 Å NiCr. BCLs of Cu, CuNi, and Ru, within this structure, were then compared. The magnetic properties of the annealed "free layer" structures were measured by a B-H looper and Phase Matrix tester. The results are summarized in TABLE I below:

TABLE I

| Structure 80.9% NiFe/MnPt 43% | Bs | Hc | Hk | Rs | Field to close HA |
|---|---|---|---|---|---|
| NiCr55/Ru15/CoFe20/Cu20/NiCr50 | 0.31 | 6.13 | 8.57 | 31.90 | 3 Oe |
| NiCr55/Ru20/CoFe20/Cu20/NiCr50 | 0.27 | 6.96 | 9.15 | 29.26 | 3 Oe |
| NiCr55/Ru15/NiFe34CoFe2/Cu20/NiCr50 | 0.28 | 6.42 | 7.80 | 27.12 | 1.5 Oe |
| NiCr55/Cu15/NiFe34—CoFe2/Cu20/NiCr50 | 0.31 | 8.04 | 12.52 | 24.86 | 8 Oe |
| NiCr55/Cu15/CoFe2o/Cu2o/NiCr50 | 0.30 | 10.31 | 16.08 | 28.01 | 20 Oe |
| NiCr55/CuNi15/CoFe20/Cu20/NiCr50 | 0.28 | 10.35 | 16.55 | 30.24 | 20 Oe | where $B_s$ = magnetic moment, $H_c$ = free layer coercivity (oe), $H_k$ = anisotropy field (oe), and $R_s$ = sheet resistance (ohm/sq.), HA = hard axis.

It was found that, after anneal, CoFe or (NiFe—CoFe) formed on the Cu layer exhibited isotropic behavior, while these layers, when deposited on the Ru, showed anisotropy characteristics along with lower Hc and Hk. Hk for CoFe (or NiFe—CoFe) formed on the Ru and Cu (or CuNi) layers was 8–9 and >13 Oe, respectively. The tangential field that was needed to close the CoFe (or NiFe—CoFe) free layer hard axis (HA) loop for the Ru-based structures was much smaller than for the Cu- or CuNi- based structures.

It was found that the low field (50 Oe), 290° C., 2 hours free layer reset anneal caused little pinned layer rotation (less than 1 degree). The performance of SyAF SV made with Ru and Cu BCL layers is compared in TABLE II below:

TABLE II

| Structure 80.9% NiFe/MnPt 43% | Bs | Hc | He | Hk | Rs | Dr/r | Dr |
|---|---|---|---|---|---|---|---|
| CZB55/Ru15/CoFe20/Cu20/CeFe19/Ru7.5/CoFe21/MP120/NiCr50 | 0.30 | 5.69 | 4.93 | 6.27 | 16.9 | 12.0 | 2.02 |
| NiCr55/Cu15/CoFe20/Cu20/CoFe19/Ru7.5/CoFe21/MP120/NiCr50 | 0.28 | 6.64 | -12.97 | 11.71 | 16.8 | 10.9 | 1.84 |
| NiCr55/Ru15/NiFe34CoFe2/Cu20/CoFe19/Ru7.5/CoFe21/MP120/NiCr50 | 0.30 | 4.26 | 2.71 | 2.55 | 16.0 | 9.8 | 1.56 |
| NiCr55/Cu15/NiFe34—CoFe2/Cu20/CoFe19/Ru7.5/CoFe21/MP120/NiCr50 | 0.30 | 11.84 | -6.04 | 7.42 | 15.5 | 10.2 | 1.58 |

Thus, for SVs made with a CoFe free layer, besides improving free layer anisotropy, SyAFSVs formed with a BCL made of ruthenium yield higher Drtr than those formed with Cu BCLs. Since $H_k$ for the Ru based spin valve is much smaller than for the Cu based spin valve, the former device has a higher sensor sensitivity, resulting in higher output performance.

When compared with SyAF SVs made with a 34A NiFe-2ACoFe free layer, SyAF SVs having a CoFe free layer gained 30% in signal amplitude. A CoFe free layer could not, however, be used in this structure because of the poor free layer anisotropy when it is formed on a Cu BCL.

Device modeling for the Ru (BCL)-SyAF spin valve has also been done. This showed that two major specular reflection effects were playing an important role in determining the operating characteristics of the structure of the present invention. One originates at the Ru/CoFe (free layer) interface and contributes to enhancing the GMR ratio (Dr/r). The other originates at the NiCr/Ru interface and serves to shift the current center toward the free layer. This results in only a small bias point shift by the sense current fields.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a spin valve head, comprising:

providing a dielectric underlayer and depositing thereon a seed layer;

depositing on said seed layer a layer of ruthenium, thereby forming a ruthenium-seed layer interface which facilitates specular reflection of conduction electrons and results in only a small bias point shift by sense current fields;

depositing a free layer on the ruthenium layer, thereby forming a ruthenium-free layer interface which facilitates specular reflection of conduction electrons and results in an improved GMR ratio;

depositing on the free layer a non-magnetic copper spacer layer;

depositing on the copper spacer layer a synthetic antiferromagnetic layer;

depositing on the synthetic antiferromagnetic layer a cap layer; and then annealing the spin valve head.

2. The process of claim 1 wherein the ruthenium layer is deposited by DC-magnetron sputtering at a deposition power of about 20 watts, a gas pressure of about 2 millitorr, a target/substrate spacing of about 2 inches, and a deposition rate of about 0.3 Angstroms/second.

3. The process of claim 2 wherein the ruthenium layer has a hexagonal close-packed crystal structure.

4. The process of claim 1 wherein the seed layer is nickel-chromium between about 40 and 70 Å thick, the ruthenium layer is between about 15 and 30 Å thick, the copper layer is about 20 Å thick, the synthetic antiferromagnetic layer further comprises:

a first cobalt-iron layer between about 18 and 23 Å thick;
a ruthenium layer between about 6 and 9 Å thick; and
a second cobalt-iron layer between about 18 and 23 Å thick, the manganese-platinum layer is between about 100 and 200 Å thick, and the cap layer is nickel-chrome between about 20 and 50 Å thick.

5. The process of claim 4 wherein the free layer is cobalt-iron between about 15 and 40 Å thick.

6. The process of claim 4 wherein the free layer is cobalt between about 15 and 40 Å thick.

7. The process of claim 4 wherein the free layer further comprises between about 2 and 5 Å of cobalt-iron on between about 34 and 75 Å of nickel-iron.

8. The process of claim 1 wherein the step of annealing further comprises heating in a magnetic field of between about 5,000 and 10,000 Oersted at a temperature between about 250 and 280° C. for between about 150 and 300 minutes, whereby the synthetic antiferromagnetic layer acquires a permanent pinned layer direction, and then heating once more in a magnetic field of between about 50 and 100 Oersted at a temperature between about 230 and 280° C. for between about 30 and 60 minutes, whereby the free layer has its sensor layer direction reset.

9. The process of claim 1 wherein the dielectric underlayer is selected from the group consisting of aluminum oxide and silicon oxide.

10. A spin valve head, comprising:

a seed layer on a dielectric underlayer;

a bias control layer of ruthenium on the seed layer;

a ruthenium-seed layer interface which facilitates specular reflection of conduction electrons, resulting in only a small bias point shift by sense current fields;

a free layer on the ruthenium layer;

a ruthenium-free layer interface which facilitates specular reflection of conduction electrons, resulting in an improved GMR ratio;

a non-magnetic copper spacer layer on the free layer;

a synthetic antiferromagnetic layer on the copper spacer layer; and a cap layer on the synthetic antiferromagnetic layer.

11. The spin valve head of claim 10 wherein the bias control layer underlies the entire free layer.

12. The spin valve head of claim 10 wherein the seed layer is nickel-chromium about 55 Å thick, the ruthenium layer is about 15 Å thick, the copper layer is about 20 Å thick, the synthetic antiferromagnetic layer further comprises:

a ruthenium layer about 7.5 Å thick; a cobalt-iron layer about 21 Å thick; and a manganese-platinum layer about 120 Å thick; and the cap layer is nickel-chrome about 50 Å thick.

13. The spin valve head of claim 12 wherein the free layer is cobalt-iron between about 15 and 40 Å thick.

14. The spin valve head of claim 12 wherein the free layer is cobalt between about 15 and 40 Å thick.

15. The spin valve head of claim 12 wherein the free layer further comprises between about 2 and 5 Å of cobalt-iron on between about 34 and 75 Å of nickel-iron.

16. The spin valve head of claim 10 wherein the ruthenium layer has a hexagonal close-packed crystal structure.

17. The spin valve head of claim 10 wherein the dielectric underlayer is selected from the group consisting of aluminum oxide and silicon oxide.

* * * * *

UNITED STATES PATENT AND TRADEMARK OFFICE
CERTIFICATE OF CORRECTION

| | | |
|---|---|---|
| PATENT NO. | : 6,396,671 B1 | Page 1 of 1 |
| DATED | : May 28, 2002 | |
| INVENTOR(S) | : Cheng T. Horng, Mao-Min Chen, Kochan Ju, Min Li, Simon H. Liao and Ru-Ying Tong | |

It is certified that error appears in the above-identified patent and that said Letters Patent is hereby corrected as shown below:

<u>Title page,</u>
Item [75], please delete "Ku-Ying Tong", and replace it with -- Ru-Ying Tong --.

Signed and Sealed this

Twenty-seventh Day of August, 2002

*Attest:*

JAMES E. ROGAN
*Attesting Officer*   *Director of the United States Patent and Trademark Office*